United States Patent [19]

Lamendola

[11] Patent Number: 5,503,189
[45] Date of Patent: Apr. 2, 1996

[54] FLANGE PROTECTOR HAVING FLEXIBLE COUPLING INSERT AND METHOD FOR DETACHABLY COUPLING SAME TO A CONDUIT

[75] Inventor: Michael J. Lamendola, Erie, Pa.

[73] Assignee: Bunzl Plastics, Inc., St. Louis, Mo.

[21] Appl. No.: 440,922

[22] Filed: May 15, 1995

[51] Int. Cl.⁶ .................................................. B65D 59/06
[52] U.S. Cl. ........................................ 138/96 R; 138/89.3
[58] Field of Search .................... 138/89, 89.4, 94, 138/96 R, 110; 220/281, 306, 352

[56] References Cited

U.S. PATENT DOCUMENTS

| | | | |
|---|---|---|---|
| 1,491,325 | 4/1924 | Thomas, Jr. .............................. | 138/89 |
| 1,903,220 | 3/1933 | Lemert . | |
| 2,737,205 | 3/1956 | Stringfield . | |
| 2,756,793 | 7/1956 | Tupper ..................................... | 220/281 |
| 3,104,681 | 9/1963 | Gray, Jr. . | |
| 3,148,798 | 9/1964 | Brown ..................................... | 138/89 |
| 3,283,639 | 11/1966 | Holton . | |
| 3,370,615 | 2/1968 | Tamaki et al. . | |
| 3,448,772 | 6/1969 | Delamater . | |
| 3,675,685 | 7/1972 | Potter ....................................... | 138/89 |
| 3,996,966 | 12/1976 | Princell . | |
| 4,046,168 | 9/1977 | Milne . | |
| 4,157,100 | 6/1979 | Turk . | |
| 4,158,407 | 6/1979 | Rest . | |
| 4,168,726 | 9/1979 | Klennert . | |
| 4,295,680 | 10/1981 | Grasso . | |
| 4,303,101 | 12/1981 | Tholen . | |
| 4,413,748 | 11/1983 | Kessler et al. ........................... | 220/281 |
| 4,423,753 | 1/1984 | Smith et al. . | |
| 4,869,293 | 9/1989 | Botsolas . | |
| 4,915,137 | 4/1990 | Hall et al. . | |
| 5,048,571 | 9/1991 | Ellis . | |
| 5,224,514 | 7/1993 | Taylor . | |
| 5,337,792 | 8/1994 | Tempel . | |
| 5,351,718 | 10/1994 | Barton ...................................... | 138/94 |

FOREIGN PATENT DOCUMENTS 2037961  7/1980  United Kingdom .

Primary Examiner—Timothy F. Simone
Assistant Examiner—James F. Hook
Attorney, Agent, or Firm—Oliff & Berridge

[57] ABSTRACT

A protector for protecting a machined surface of a conduit includes a plate member for contacting the machined surface of the conduit, a flexible inner portion formed integrally with the plate member, and a handle that is formed integrally with the plate member and is defined on an opposite side of the protector by the flexible inner portion. The flexible inner portion is cooperable with an inner surface of the conduit to form an interference fit therewith. The handle is resilient so as to selectively deform the flexible inner portion to insert the inner portion into the conduit. When the handle is released, the resiliency of the handle allows the flexible member to return to its original position.

13 Claims, 3 Drawing Sheets

FLANGE PROTECTOR HAVING FLEXIBLE COUPLING INSERT AND METHOD FOR DETACHABLY COUPLING SAME TO A CONDUIT

BACKGROUND OF THE INVENTION

1. Field of the Invention

This invention relates to flange protectors, and more particularly to a lightweight, weather resistant flange protector for temporary application to the flange of a pipe, valve or other conduit so as to protect the machined surface of the flange from damage during shipment and handling. This invention also relates to a method for coupling a flange protector to a conduit.

2. Discussion of Related Art

Flange protectors are known in the art for covering and protecting pipe flanges. Various mechanisms are employed for attaching the flange protector to the flange. For example, see U.S. Pat. Nos. 5,048,571 to Ellis, 4,915,137 to Hall et al., 4,303,101 to Tholen, 4,046,168 to Milne, 3,448,772 to Delamater, 3,370,615 to Tamaki et al., 3,283,639 to Holton, 3,104,681 to Gray, Jr., 2,737,205 to Stringfield, 5,224,514 to Taylor, 1,903,220 to Lemert, 4,157,100 to Turk, 4,158,407 to Rest, 4,168,726 to Klennert, 4,295,680 to Grasso, 4,869,293 to Botsolas, 5,337,792 to Tempel and U.K. Patent No. 2,037,961. While these prior art flange protectors are generally suitable for protecting flanges or pipe ends, they require cooperation with the structure of the flange in order to attach the flange protector to the flange. For example, U.S. Pat. No. 4,423,753 to Smith et al. requires that the flange be provided with holes, and U.S. Pat. No. 1,903,220 to Lemert requires bendable tabs that go around the outside diameter of the flange to secure the flange protector to the flange.

In addition, while some prior art end protectors, for example U.S. Pat. Nos. 3,104,681, 3,370,615, and 4,303,101, utilize the inside diameter of the conduit to secure the protector, these protectors are not suitable for use in protecting flanged pipe designs. For example, U.S. Pat. No. 4,157,100 secures an end cap protector to the end of a conduit using the inside diameter but additionally requires cooperation with the outer diameter pipe threads to secure the protector to the conduit.

Furthermore, while U.S. Pat. No. 3,996,966 to Princell discloses a protector for preventing contaminants from entering the opening of an automobile gas tank in which the dust protector attaches to the inside diameter of the gas tank outlet pipe, this device requires difficult manipulation and eventual destruction of the dust protector in order to remove it from the opening.

In summary, prior art flange protectors fail to provide an adequate structure for securing the flange protector to the flange, which structure is oftentimes dependent on the structure of the flange itself. While other protectors sometimes generally use the inner diameter of the conduit to which they are attached to provide a secure connection between the flange protector and the conduit, these devices require additional securing devices, are difficult to remove and result in destruction of the protector during the removal operation.

SUMMARY OF THE INVENTION

It is thus an object of the invention to provide a flange protector that is capable of being attached to a flange pipe or conduit independent of the structure of the flange itself.

Another object is to provide a flange protector that is easily attachable to and detachable from the inside diameter of the pipe adjacent the flange portion of the pipe.

To achieve these and other objects and advantages, the inventive flange protector of the present invention comprises a plate member for contacting the machined surface of a conduit, at least one flexible inner portion formed integrally with and on a first side of the plate member, the flexible inner portion being cooperable with an inner surface of the conduit to form an interference fit therewith, and a handle formed integrally with the plate member on a second side opposite the first side. The handle is resilient so as to selectively move the flexible inner portion between compressed and released positions, the compressed position allowing insertion and removal of the flexible inner portion relative to the conduit, the resiliency of the handle allowing the flexible inner portion to return to the released position to create the interference fit.

According to a second aspect of the invention, a protector is provided for protecting a machined surface of a conduit comprising a plate member for contacting the machined surface of the conduit, a flexible inner portion formed integrally with the plate member, the flexible inner portion being cooperable with an inner surface of the conduit to form an interference fit therewith, and structure integral with the plate member for selectively deforming the flexible inner portion to insert the flexible inner portion into the conduit to create the interference fit and to release the interference fit.

According to a third aspect of the invention, a method is provided for detachably coupling a protector to a conduit, the protector including a plate member that contacts a machined surface of the conduit, a flexible inner portion and a handle. The method comprises deforming the handle to reduce a dimension of the flexible inner portion of the protector, inserting the flexible inner portion within an inner portion of the conduit until the plate member contacts the machined surface, and releasing the handle to establish an interference fit between an inner surface of the conduit and the flexible inner portion.

These and other aspects and advantages of the present invention are described in or apparent from the following detailed description of preferred embodiments.

BRIEF DESCRIPTION OF THE DRAWINGS

Preferred embodiments are described with reference to the drawings in which.

DETAILED DESCRIPTION OF PREFERRED EMBODIMENTS

Figure 3:
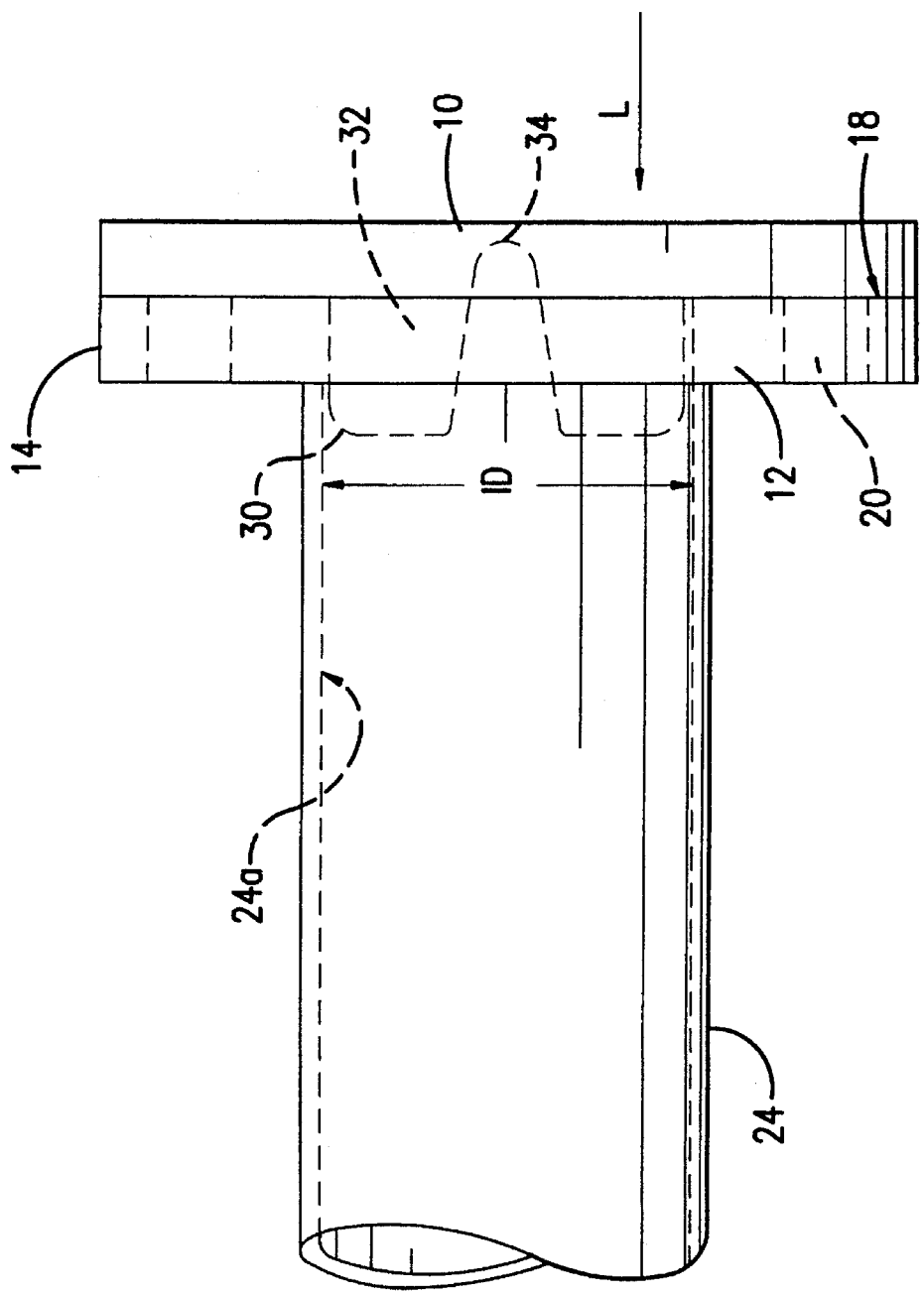
FIG. 3 is a schematic view of the flange protector connected to a flanged pipe, the details of the flange protector being left out for clarity.

FIG. 3 shows a flange protector 10 for protecting flanges used in making connections to pipes, valves and the like. Such flanges are made to Army, Navy and ASA standards and are characterized by a hub 12 that may be connected to or integral with a pipe 24 or valve, and a flange 14 integral with the hub 12. The hub 12 may or may not have bolt holes 20 for bolting the flange to a corresponding mating flange of another pipe (not shown) to make a fluid-tight connection. A machined (gasket) surface 18 is provided on a sealing face of the flange against which an optional gasket (not shown) may be compressed when the flanges are bolted together or otherwise mated.

Rough or irregular machined flange surfaces require greater deformation of the gasket and therefore greater pressure to effect a seal. Accidental scratches, dents or nicks in the machined surface 18 of the flange caused by bumping during transit may cause leakage. It is therefore essential that the machined surface 18 be protected until the flange is ready for use. It will also be desirable that the protector be made of a lightweight, impact resistant and weather resistant material.

The present invention provides a single piece flange protector that incorporates all the advantageous features of the prior art flange protectors, but is also inexpensive, lightweight, impact resistant and weather resistant. The inventive flange has unexpected superiority in design, especially with regard to the flange protector coupling structure.

Figure 1:
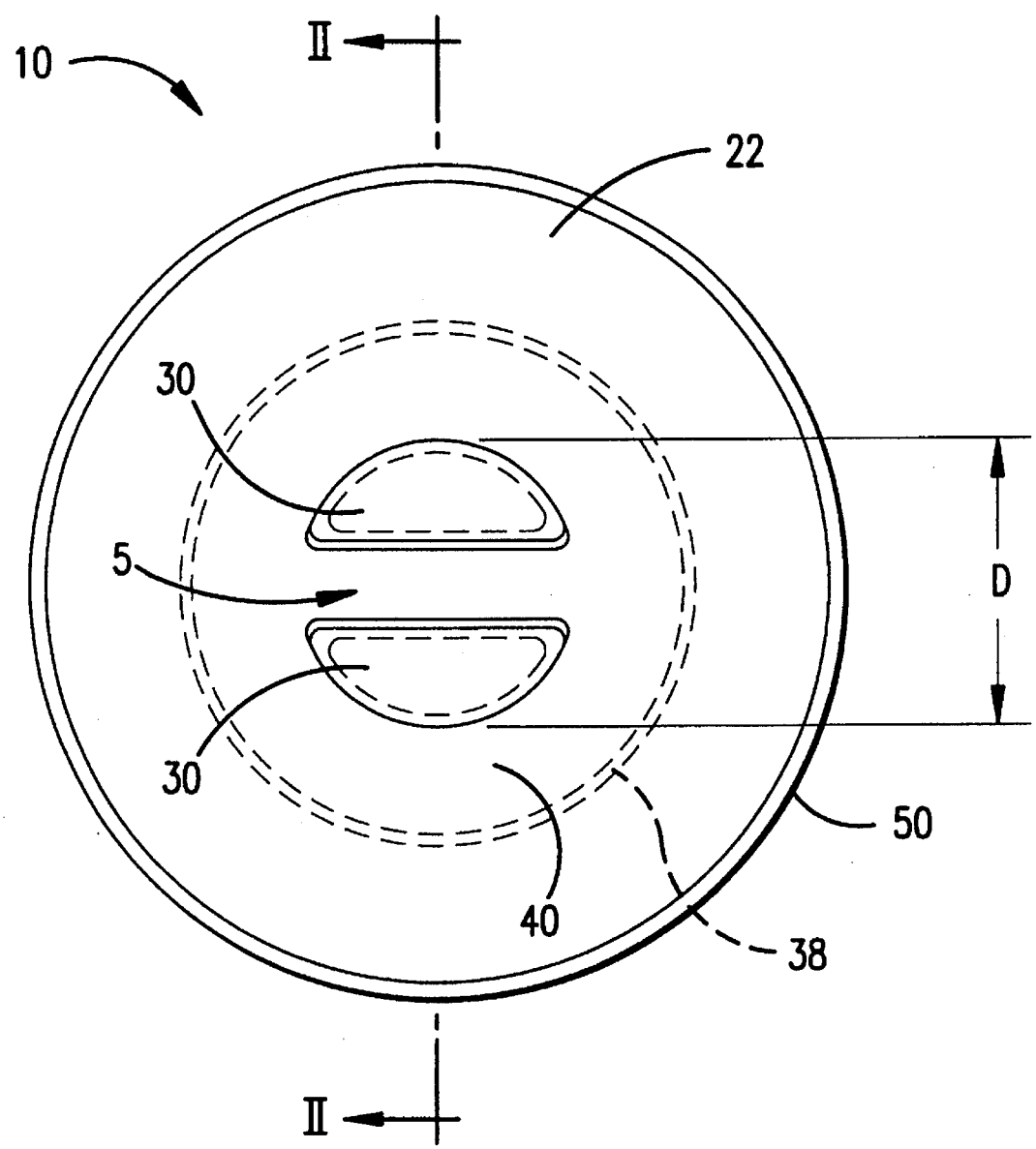
FIG. 1 is a top side elevational view of the flange protector of the present design viewed in the director of arrow I—I of FIG. 2.

As shown in FIG. 1, the flange protector 10 is a single disk constructed from a plastic flexible material with high resiliency. The flange protector 10 is cut or formed from a sheet and has a diameter sufficient to cover the entire flange including machined surface 18 of the flange or pipe end.

The flange protector 10 can be connected to the end of the flange using the inside diameter of the pipe or conduit to form a frictional interference fit with the flange protector 10 to maintain the plate member 22 in the vicinity of or in contact with the machined surface 18 of the pipe flange. In particular, while plate member 22 remains in contact with at least a portion of flange 14 of pipe 24, flexible inner portions 30, which are formed integrally with the plate member 22, form an interference fit with the inside diameter surface 24a of the pipe 24 as shown in FIG. 3.

As shown in FIG. 1, each flexible inner portion 30 includes, for example, a semi-circular shape. Of course, other configurations and shapes for the inner portions 30 can be envisioned. In addition, not all inner portions need be resilient; only one need be flexible towards and away from one or more remaining inner portions.

A space S is provided between the semi-circular flexible inner portions 30. The distance D spanning the inner portions 30 (defined by the space S plus the radial dimension of each of the flexible inner portions) is greater than the inner diameter ID of flange 24 at least before deforming and assembling the flange protector 10 to the flange 14.

Figure 2:
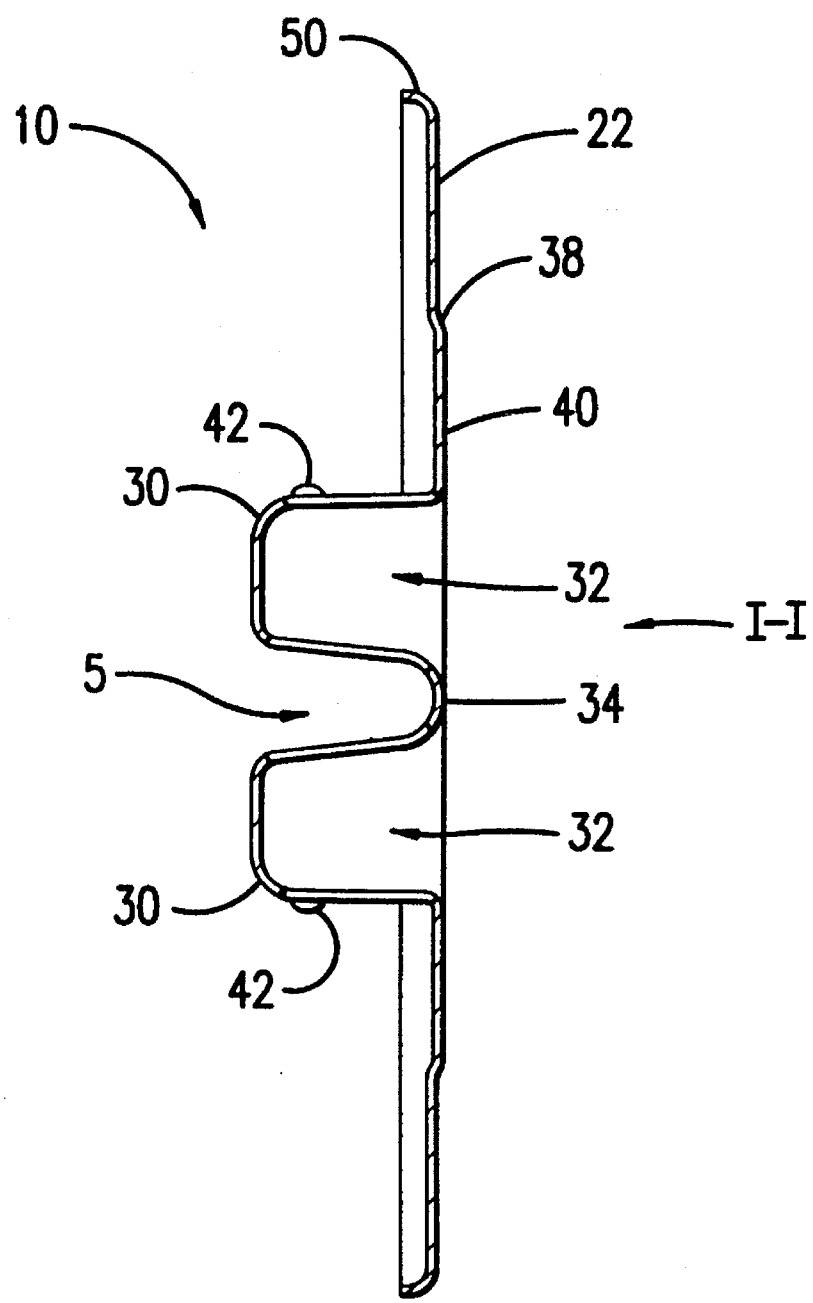
FIG. 2 is a cross-sectional view along section II—II shown in FIG. 1.

In addition, as best shown in FIG. 2, the side of the flange protector opposite each of the flexible inner portions 30 form finger insert wells 32 configured to receive fingers or other appropriate apparatus for clamping a handle portion 34. The handle portion 34 is formed on the flange protector opposite space S. The handle portion 34 is resilient; it can be squeezed in a compressed position to decrease the space S between the inner portions 30 (and thereby decrease the distance D), and it can be released to allow the inner portions to spring back to their original released position to re-establish the original space S and distance D.

In operation, the flange protector 10 is grasped by its handle 34 such that fingers protrude into each of the wells 32. When it is desired to attach the flange protector 10 to the flange 14, handle 34 is squeezed so as to reduce the size of space S and the distance D. Once the distance D is judged to be less than the inner diameter ID of pipe 24, the flexible inner portions 30 are inserted within the inner diameter surface 24a of pipe 24 until plate member 22 of protector 10 makes contact with flange surface 18. At that point, handle 34 is released and, by its innerent resiliency, exterior surfaces of the flexible inner portions 30 make contact with respective portions of inner surface 24a to thereby form a secure interference fit between flexible inner portions 30 and the inner diameter 24a of pipe 24. Plate member 22 may further include a rim 50 and a ridge 38 that defines a radial annular portion 40 of the flange protector that does not contact the flange.

In addition, the exterior surfaces of each of the flexible inner portions 30 may be formed with at least one lug portion 42 that contacts the inner diameter surface 24a of pipe 24. The lug portions 42 enhance the overall gripping effect and ability to easily remove the flange protector from the pipe.

Once the pipe has been transported to its intended destination, the pipe flange may be easily removed by once again compressing handle 34 to decrease the size of space S, thereby releasing the interference fit. Once the handle 34 has been compressed, the flange protector 10 is axially removed from the interior surface 24a of pipe 24 to expose flange surface 18 for connection to another flange and the like.

The invention has been described with reference to its preferred embodiments, which are intended to be illustrative but not limiting. For example, the invention has been described with reference to conventional flanged pipes, but other pipe shapes are possible that would require corresponding flange protector shapes; the protector is also adaptable for use in conduits having a cross-sectional shape that is rectangular or otherwise non-circular. Thus, variations and changes may be made without departing from the spirit and scope of the invention as defined in the following claims.

What is claimed is:

1. A protector for protecting a machined surface of a conduit comprising:

a plate member for contacting and completely covering the machined surface of the conduit;

at least one flexible inner portion formed integrally with and on a first side of said plate member, said flexible inner portion having a peripheral surface generally parallel to and engagable with an inner surface of said conduit to form an interference fit in an axial direction of the conduit along the peripheral surface engaging with the inner surface; and a handle formed integrally with said plate member on a second side opposite from said first side, said handle being resilient so as to selectively move said at least one flexible inner portion between compressed and released positions, the compressed position allowing insertion and removal of the peripheral surface of the inner portion relative to the inner surface of the conduit, the resiliency of the handle allowing the inner portion to return to the released position to create the interference fit.

2. The protector of claim 1, wherein said plate member includes at least two offset radial surfaces, a first one of said radial surfaces being in contact with said machined surface, and a second one of said radial surfaces being spaced from the machined surface.

3. The protector of claim 1, further comprising a rim located at an outer periphery of said plate member, said rim extending toward said conduit in a generally axial direction.

4. The protector of claim 1, wherein said at least one flexible inner portion includes two inner portions separated by a space on the first side of the plate member.

5. The protector of claim 4, wherein said space is formed opposite said handle.

6. The protector of claim 4, wherein at least one of said two inner portions includes at least one lug member for selectively contacting the inner surface of the conduit.

7. The protector of claim 1, wherein said at least one flexible inner portion defines a finger insertion well on said opposite side of the plate member.

8. The protector of claim 1, wherein said flexible inner portion includes at least one lug member for selectively contacting the inner surface of the conduit.

9. The protector of claim 1, wherein said inner surface of said conduit has a substantially constant diameter along an entire axial length thereof; and said peripheral surface of said flexible inner portion is cooperable with said inner surface of said conduit to form said interference fit.

10. A protector for protecting a machined surface of a conduit comprising:

a plate member for contacting and completely covering the machined surface of the conduit;

a flexible inner portion formed integrally with said plate member, said flexible inner portion having a peripheral surface generally parallel to and engagable with an inner surface of said conduit to form an interference fit in an axial direction of the conduit along the peripheral surface engaging with the inner surface; and means integral with the plate member for selectively deforming said flexible inner portion to insert the flexible inner portion into the conduit to create the interference fit and to release the interference fit.

11. The protector of claim 10, wherein said inner surface of said conduit has a substantially constant diameter along an entire axial length thereof; and said peripheral surface of said flexible inner portion is cooperable with said inner surface of said conduit to form said interference fit.

12. A method for detachably coupling a protector to a conduit, said protector including a plate member that contacts and completely covers a machined surface of the conduit, a flexible inner portion that has a peripheral surface generally parallel to and engagable with an inner surface of the conduit, and a handle, said method comprising:

deforming the handle to reduce a dimension of the flexible inner portion of the protector;

inserting the flexible inner portion within an inner portion of the conduit until the plate member contacts and completely covers the machined surface; and releasing the handle to establish an interference fit in an axial direction of the conduit between the inner surface of the conduit and the peripheral surface of the flexible inner portion.

13. The method of claim 12, wherein the flexible inner portion includes at least one lug, and the releasing step allows the lug to contact the inner surface of the pipe.

* * * * *